Sept. 5, 1939.  E. R. TORGLER  2,171,997

CLAMP FOR BELL AND SPIGOT JOINTS

Filed Jan. 9, 1937  5 Sheets-Sheet 1

INVENTOR
Edward R. Torgler
BY
Louis Prevost Whitaker
ATTORNEY

Sept. 5, 1939. E. R. TORGLER 2,171,997
CLAMP FOR BELL AND SPIGOT JOINTS
Filed Jan. 9, 1937 5 Sheets-Sheet 2
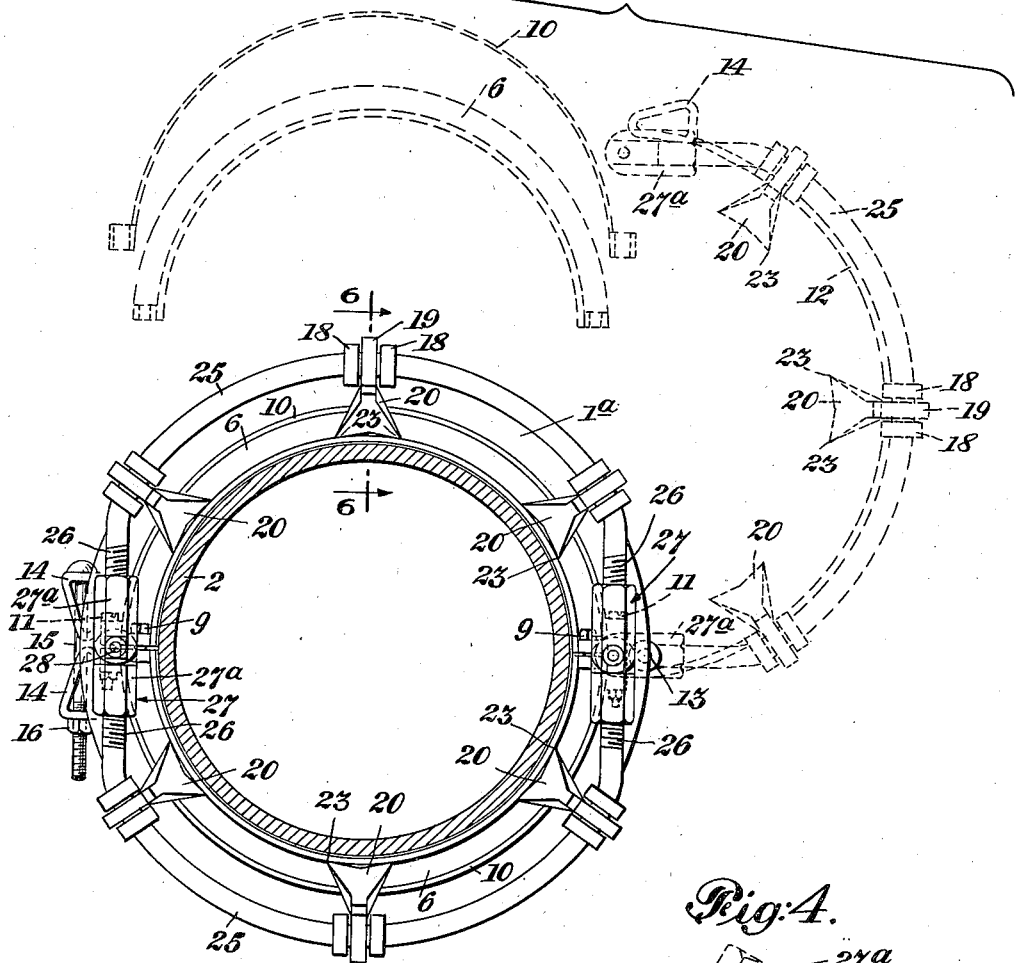
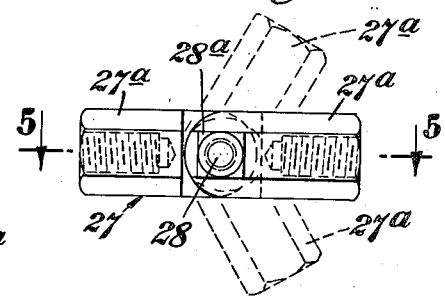
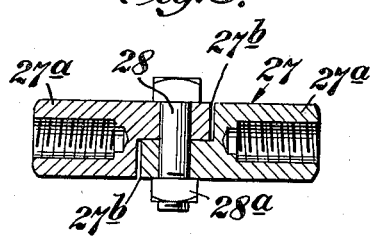
Edward R. Torgler INVENTOR
BY Louis Prevost Whitaker ATTORNEY Sept. 5, 1939. E. R. TORGLER 2,171,997
CLAMP FOR BELL AND SPIGOT JOINTS
Filed Jan. 9, 1937 5 Sheets-Sheet 3
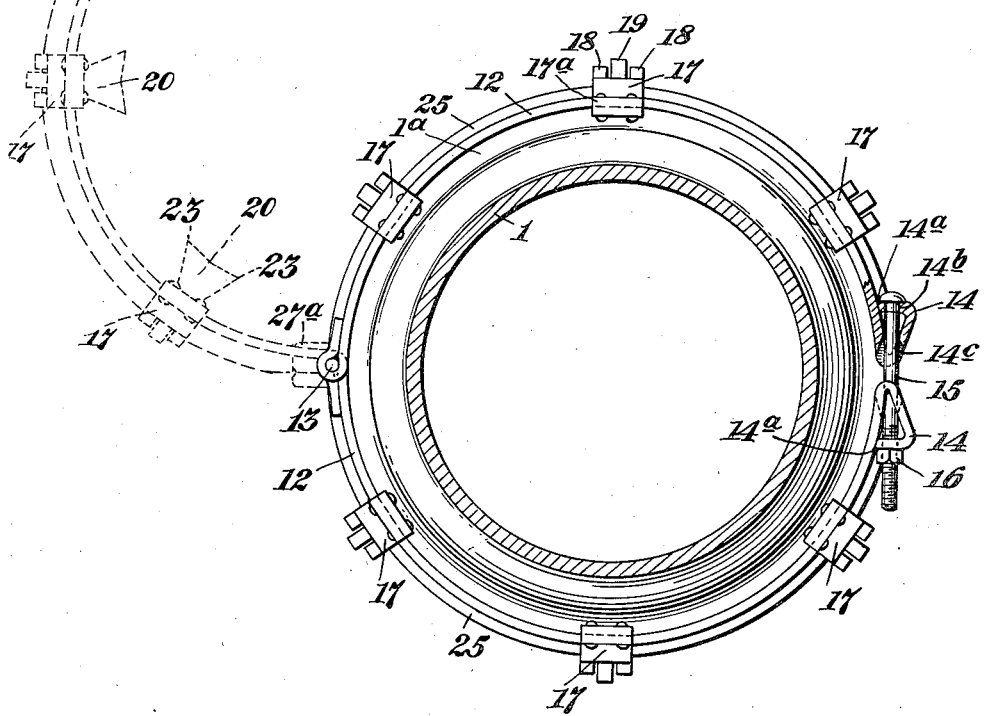

Sept. 5, 1939.  E. R. TORGLER  2,171,997
CLAMP FOR BELL AND SPIGOT JOINTS
Filed Jan. 9, 1937  5 Sheets-Sheet 4
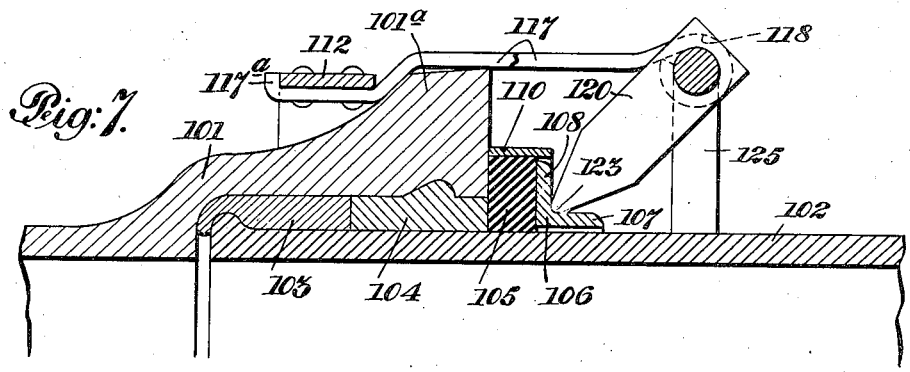
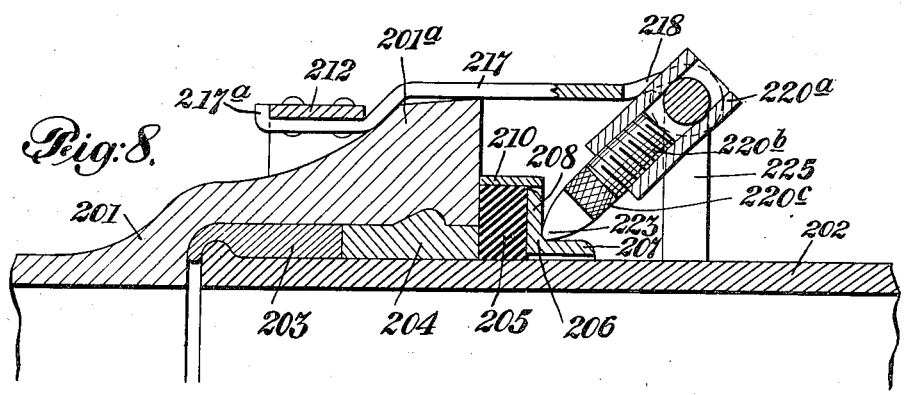
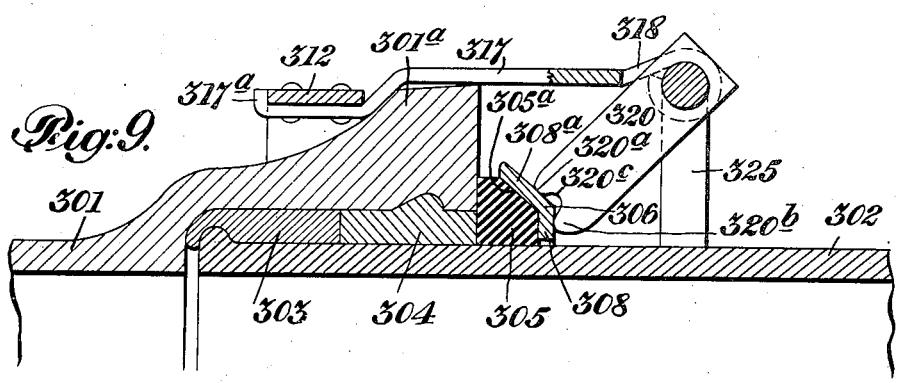

Sept. 5, 1939.  E. R. TORGLER  2,171,997
CLAMP FOR BELL AND SPIGOT JOINTS
Filed Jan. 9, 1937  5 Sheets-Sheet 5
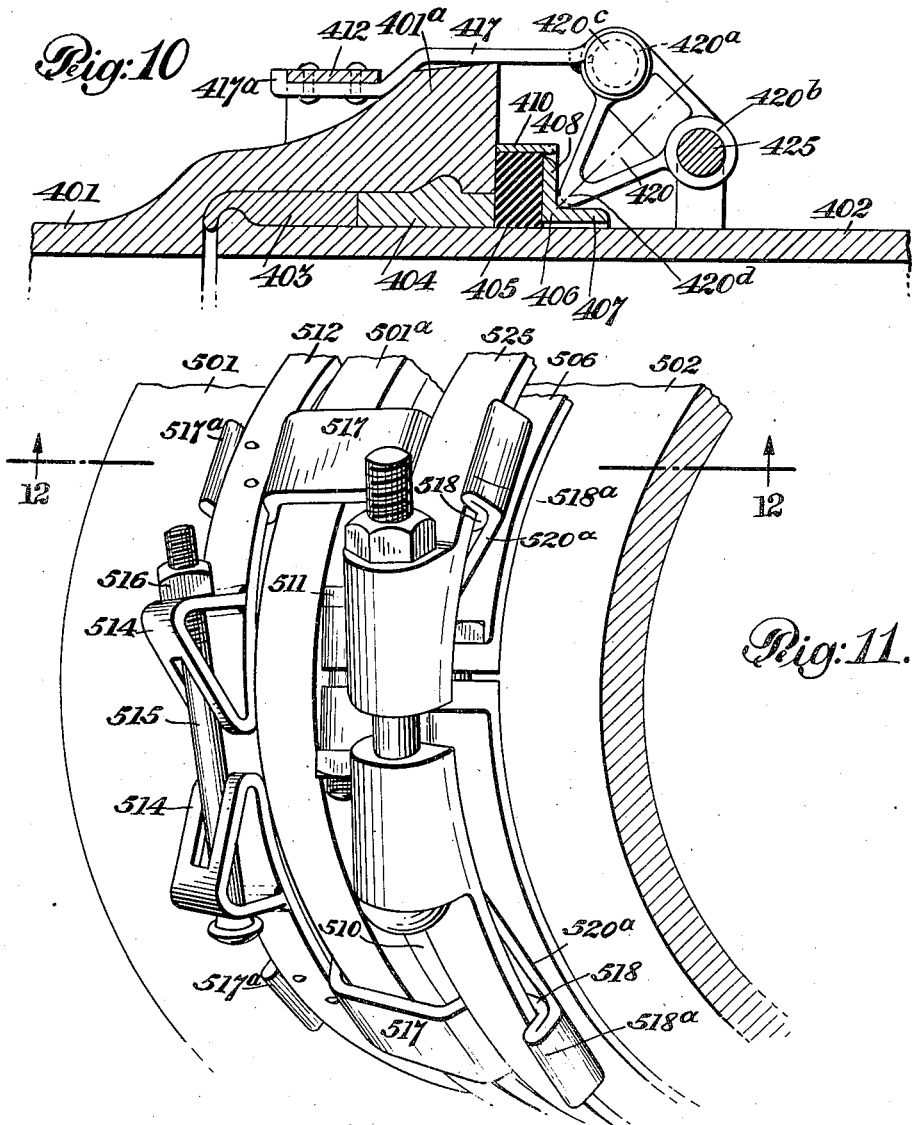
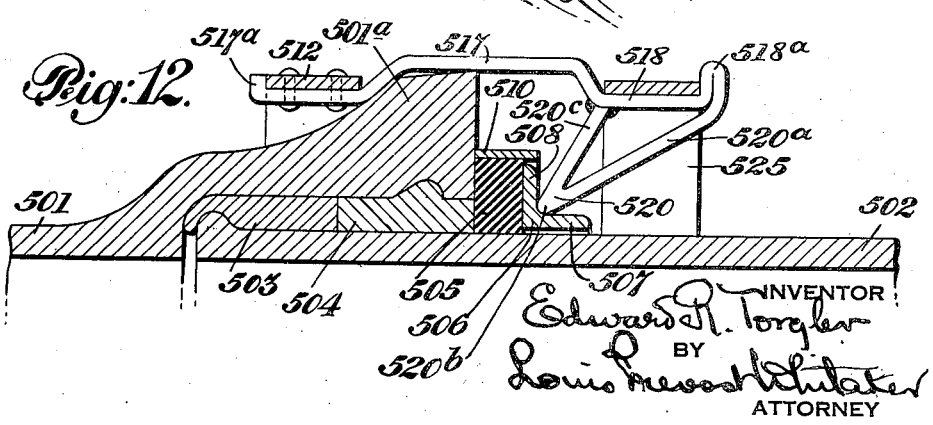

Patented Sept. 5, 1939

2,171,997

UNITED STATES PATENT OFFICE 2,171,997

CLAMP FOR BELL AND SPIGOT JOINTS

Edward R. Torgler, Bradford, Pa., assignor, by mesne assignments, to Dresser Manufacturing Company, Bradford, Pa., a corporation of Pennsylvania Application January 9, 1937, Serial No. 119,782

7 Claims. (Cl. 285—119)

My invention consists in the novel features hereinafter described, reference being had to the accompanying drawings which illustrate several embodiments of the same, selected by me for purposes of illustration, and the said invention is fully disclosed in the following description and claims.

The object of my invention is to provide a sealing device for leaky bell and spigot joints so constructed as to largely eliminate the undesirable bending stress occurring in clamps heretofore used while applying force to the sealing gasket, in the most efficient and desirable manner.

Clamps for this purpose as heretofore used have usually comprised a rubber packing, a clamping ring for forcing it into sealing engagement with the face of the bell member and the outer face of the spigot member, and a series of clamping bolts and nuts connecting the clamping ring with anchoring means connected with the bell member, so that the clamp will remain in sealing position, irrespective of the movement of the spigot member with respect to the bell member, due to temperature changes, soil settlement or other causes. This anchorage has been most conveniently effected by means engaging the fillet or scarf of the bell member, such as hooks on the ends of the bolts, an anchor ring, or bull ring as it is sometimes termed, and similar devices. Where through bolts or hook bolts are employed, it is obviously necessary that the clamp ring should have an outwardly extending flange or lugs provided with bolt apertures at such a distance from the surface of the spigot member as to enable the bolts to clear the exterior surface of the bell member. As the outside diameter of the bell member is considerably greater than the outside diameter of the spigot member, there is a large moment arm between the packing surface and the bolt surface, resulting in a correspondingly large bending moment on the flange of the clamping ring. Where the clamp is in the form of a housing with compression screws, the housing must be sufficiently strong to withstand a similar large bending moment. This bending stress occurs in radial planes through the bolt axes, and it is obvious that the section of the clamping ring must be of sufficient diameter, at least at these points, to provide for the bolt apertures therein. It is obvious that to make the entire bolt engaging flange of the clamping ring of sufficient strength and uniform diameter would be extremely wasteful of material, and to provide the requisite diameter and strength adjacent to the bolt holes only limits the construction of such rings to cast metal, usually iron or steel.

My present invention provides a novel construction of clamp in which the component parts are practically subjected only to direct tension or compression, with a practical elimination of the objectionable turning moment, while at the same time the component parts of the clamp may be constructed either of cast metal or wrought metal as may be found most desirable or convenient.

In the accompanying drawings, which illustrate several forms in which I have contemplated embodying my invention, which I have selected for purposes of illustration:

Fig. 2 represents a transverse sectional view through the spigot member shown in Fig. 1, looking in the direction of the arrow 2—2 therein, and drawn to a reduced scale, showing in dotted lines portions of the clamp removed, to facilitate the application of the clamp to a bell and spigot joint which has already been installed in a pipe line.

Fig. 3 is a similar section, taken on the dotted line 3—3 of Fig. 1, looking in the direction of the arrow and showing in dotted lines a segment of the pressure ring in open position.

Fig. 4 is a detail view of one of the turn buckles with which the pressure ring is provided, showing in dotted lines the different positions of the pivotally connected parts thereof.

Fig. 5 is a sectional view of the turn buckle, on the line 5—5 of Fig. 4.

Fig. 6 is a sectional view on the line 6—6 of Fig. 2, but shown on the same scale as Fig. 1.

Fig. 7 is a sectional view similar to Fig. 6, showing a slight modification.

Fig. 8 is a view similar to Fig. 6, showing another slight modification, in which the longitudinally adjustable struts are employed.

Fig. 9 is a view similar to Fig. 6, showing another slight modification, in which a different form of follower ring and a slightly different form of strut are employed, and in which the retaining ring or hoop is omitted.

Fig. 10 is a view similar to Fig. 6, showing another slight modification of the invention.

Fig. 11 is a partial perspective view of a bell and spigot joint with a slight modification of my improved clamp applied thereto.

Fig. 12 is a cross section on line 12—12 of Fig. 11.

Figure 1:
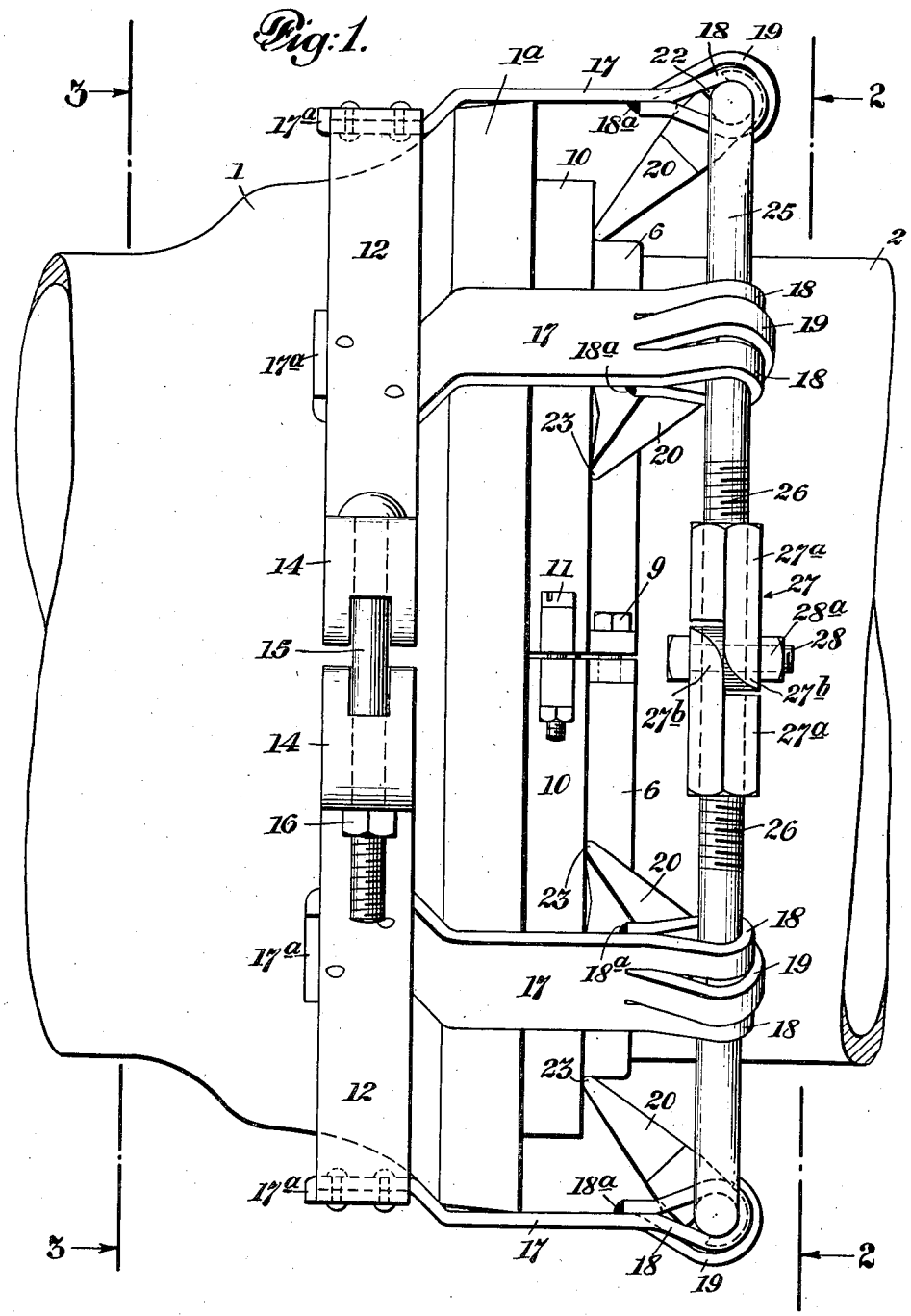
Fig. 1 represents a side elevation of a bell and spigot joint having one form of my improved clamp applied thereto.

Referring to the embodiment of my invention illustrated in Figs. 1 to 6 inclusive, 1, represents the bell member of a bell and spigot pipe, and 2, represents the spigot member of the adjacent pipe section, which are united by the usual packing means, as shown in Fig. 6, comprising suitable fibrous packing, 3, and solid packing of lead or cement, indicated at 4, within the bell member and between it and the enclosed portions of the spigot member. 5 represents a gasket formed preferably of rubber or rubber composition, and having any desired cross section. As shown in Fig. 6, it has a rectangular cross section, but this is not essential. The gasket is formed ordinarily from a strip of the desired length to pass completely around the spigot member and provided with overlapping beveled end portions, so that it may be fitted to a leaky joint in a pipe line already laid, although the gasket may be formed endless and applied in this form to the spigot member when the clamp is applied at the time the original joint is made. When formed endless, the packing ring can obviously be severed at an angle to a radius of the ring, to provide the overlapping ends where it is to be placed around the spigot member of an existing pipe line. 6 represents a follower for compressing the gasket into sealing engagement with the face of the bell member, and the solid packing 4 thereof, and the exterior surface of the spigot.

The follower in this instance comprises a cylindrical flange member 7 for encircling the spigot member, and a perpendicular annular flange 8 for engaging the gasket. The follower 6 may be formed as an integral ring, if desired, but is preferably made in sections connected by clamping bolts 9 in a well known way, to facilitate its application to a line previously laid. Where this form of follower is empoyed, I prefer to provide a retaining ring or band, indicated at 10, to surround the outer periphery of the gasket 5 and of the flange 8 of the follower, so as to prevent the outward expansion of the gasket when compressed, and this retaining band may likewise be made as an integral ring, or preferably in sections united by connecting bolts 11 to facilitate its application.

12 represents a tension ring adapted to surround the exterior of the bell and of less diameter than the scarf 1a thereof. This tension ring may be made as an integral ring where it is to be applied to the joint at the time it is originally laid in the ground, but it is preferably made in segments, suitably connected together to facilitate its application to a previously laid joint. As shown, it comprises two segments which are hinged together at 13, and have their opposite ends provided with suitable lugs 14 adapted to be connected by a bolt 15 and nut 16 as clearly shown in the drawings. As ilustrated in Fig. 3, I find it convenient to form the lugs 14 by bending back the end portions of each ring segment into triangular form and welding the terminal portion thereof to the exterior of the segment, as indicated at 14a, and providing suitable apertures, indicated at 14b and 14c, in each of said lugs, for the passage of the bolt 15.

Each segment of the tension ring is provided with one or more straps 17 each of which is provided with means for securing it to the tension ring at one end, and at the other end is provided with means for engaging a pressure ring 25 hereinafter described. Each strap is provided preferably with an upturned flange portion 17a to engage the edge of the tension ring, and I prefer to unite the strap directly to the tension ring by rivets, as shown, by welding or otherwise. The opposite end of each strap is preferably slit into three sections. The two outer sections 18—18 are bent into loop form, and their ends are welded, as at 18a, or otherwise secured to the body of the strap. The intermediate section 19 is of less length than the sections 18 and is bent into curved form of larger diameter than the loop portions 18 to serve as a friction member for one of the pivoted struts with which the pressure ring 25 is provided.

The pressure ring 25 is formed conveniently of sections of rod, wrought iron or steel, for example, the central portions of which are bent into curved form concentric with the axis of the spigot member, and the end portions of which are straight, as shown at 26. There may be two or more of these segments, according to the size of the ring, two being shown in Figs. 1 to 6. The oppositely disposed straight portions 26 of adjacent segments are reversely threaded, as shown in the drawings, and are united by turn buckles, indicated as a whole at 27. Each of these turn buckles comprises two tubular portions 27a reversely threaded interiorly and having overlapping portions 27b perforated to receive a pivot bolt 28 secured in position by a nut 28a. The tubular portions 27a of the turn buckle are preferably polygonal, usually hexagonal, on their outer surfaces to permit the entire turn buckle to be rotated in either direction by means of a wrench, while the pivot bolt 28 permits the parts 27a to assume angular portions with respect to each other. Furthermore, if one of the pivot bolts 28 is removed, the segments of the pressure ring 25 may be swung on the pivot bolt at the opposite end of the segment, to facilitate the placing of the parts around a pipe joint in a line already laid. In order that the entire clamp structure may be opened and placed around a pipe joint in this manner, the pivot bolts 28 are made to coincide with the joints between the segments of the retaining ring, as clearly shown in the drawings.

Each segment of the pressure ring is provided with a number of struts 20 corresponding with the number of straps 17 and each of these struts is provided at its outer end with an aperture 21 through which the segment of the pressure ring is passed. This aperture may be formed by a bore, but it is conveniently formed as a stamped aperture, and a portion of the wall of the aperture is conveniently cut away, as indicated at 22, so as to facilitate the removal of the struts from the sections of the pressure ring, and replacing them with struts of a different length, should this be necessary or desirable. The opposite end of each strut is given a wedge formation, and is made of considerable width, the inner edge being slightly recessed to provide widely separated points of contact, indicated at 23, in dotted lines in Fig. 3, for example, so as to prevent any slipping laterally of the struts with respect to the follower 6.

In assembling the parts, the perforated end of each strut is placed between the loops 18, 18 of one of the straps and the segment of the pressure ring 25 is then passed through the loops and strut, which is thereby held centrally with respect to the strap, and the portion of the strut surrounding the aperture is rounded and is frictionally engaged by the friction strap or friction finger 19 of the strap, with sufficient friction to hold the struts in the approximately desired position of use, when the entire ring structure is opened up previous to being applied to a pipe joint.

A very advantageous feature of the construction just described is that the tension ring, straps, struts and pressure ring can be assembled as a single unit for shipment in connection with the follower and retaining ring, so that the entire device can be conveniently shipped to and used in the field and quickly placed in position, without the possibility of any of the parts being lost or misplaced. When it is desired to apply one of these devices to a leaky bell and spigot joint, for example in a line which has been previously laid, a hole is dug around the joint so as to expose the joint all the way around. The packing 5 is placed into position, as indicated in Fig. 6, the sections of the follower 6 and retaining ring 10 are placed in engagement with the packing as therein shown. The operator will then remove the bolt 15 from the tension ring and the corresponding bolt 28 from the turn buckle 27 on the pressure ring 25. With these bolts removed, the ring structure can be opened, as indicated in dotted lines in Figs. 2 and 3, to permit it to be placed around the joint, with the tension ring around the bell member in rear of the scarf, and the pressure ring around the spigot member at such distance therefrom as to bring the separate points of contact of the struts into engagement with the follower in the angle formed by the flanges 7, 8 thereof, and at an angle of approximately 45° to the axis of the pipe line. The bolts 15 and 28 are then replaced, and the nut 16 of the bolt 15 is tightened up so as to bring the straps into contact with the outer peripheral surface of the scarf. The turn buckles are then turned up, with the effect that the pressure ring will be gradually reduced in size. This applies great force to the struts 20 which is transmitted to the follower 6 substantially equally all the way around, and causes the follower to move in a direction toward the bell member, thereby compressing the gasket 5 into sealing engagement with the exterior of the spigot member, the face of the bell member and the face of the solid packing 4. As the pressure of the pressure ring 25 on the outer ends of the struts increases, the outer ends of the struts will be forced toward the exterior surface of the spigot and the adjacent ends of the straps will be usually bent inwardly somewhat toward the spigot member, thereby decreasing the angle of the struts to the axis of the pipe line.

For most efficient operation, the struts should move through an angle between 45° and 30° to the axis of the pipe. If the initial angle is greater than 45°, a great deal of effort at the turn buckles will produce relatively small pressure on the gasket. If the angle is less than 30°, a large inward movement of the pressure ring will produce relatively small longitudinal movement of the follower, so that in either case there is danger of failure to obtain the desired gasket pressure when the strut has been brought as nearly as practicable to a position parallel to the spigot member. It will also be seen that in the application of pressure to these struts, the greater the pressure exerted upon them in a direction perpendicular to the axis of the pipes, the more nearly they approach a position parallel to said axis, thereby exerting a toggle like action directly on the follower in lines approximately parallel to the axis of the pipe, which insures high efficiency of the apparatus.

It will be understood that the straps, which are ordinarily made of sheet wrought iron or steel, are sufficiently flexible to accommodate the movement of the outer ends of the struts in a direction toward the axis of the pipe to any reasonable extent. As there is no turning moment on the outwardly extending flange of the follower, the follower may be made with an outwardly extending flange not exceeding the outer diameter of the gasket, and without any special reinforcement, since the pressure is applied to it at the line of union between the cylindrical and outwardly extending flanges 7 and 8 respectively.

In Fig. 7, in which the parts corresponding with those in Figs. 1 to 6 have been given the same reference numerals with the addition of 100, I have shown a slightly simplified form of my invention, in which the anchoring means for the outer ends of the struts for connecting them with the bell member, represented in Figs. 1 to 6 by the bifurcated straps 17 are here represented as a pair of separate straps 117, 117 having loop portions 118 for engaging the pressure ring 125 one of the straps being broken away to show the companion strap. Obviously a single strap, bifurcated as shown in Figs. 1 to 6, or otherwise, can be utilized for each strut. It will also be understood that in any of the forms shown, where it is not desired to have the entire apparatus connected together so that it can be handled as one unit, the rivets connecting the straps to the tension ring might be omitted, if desired. It will also be understood that the pressure ring shown in Fig. 7 will be provided with one or more turn buckles engaging reversely threaded meeting portions of the ring, which turn buckles may be made in one piece, if desired, although obviously the turn buckles formed in two parts and pivotally connected and shown in Figs. 1 to 6, are the more convenient structures.

In some instances, due to slight variations in the parts, it may be found that the effective length of the struts is either greater or less than desired to apply the necessary force or pressure to the follower within the range of movement of the struts, from approximately 45°, to approximately 30°. In Fig. 8, in which the parts corresponding with those shown in Figs. 1 to 6 are given the same reference numerals with the addition of 200, I have shown a strut made in two parts, one part 220a which is pivotally engaged by the pressure ring 225 as a tubular portion interiorly threaded, the other part of the strut, indicated at 220b, being exteriorly threaded and screwed into the part 220a and being also preferably provided with a milled or knurled portion 220c to enable it to be rotated with respect to the part 220a to increase or decrease the effective length of the strut. Obviously the same result could be accomplished by using struts of different lengths, but the adjustable struts shown in Fig. 8 may be found to be convenient and desirable.

While I have shown the follower as having a compressing flange 8 (108, 208) for engaging the gasket and used in conjunction with a retaining ring 10 (110, 210) it is not essential that this gasket arrangement should be followed. In Fig. 9, for example, in which the parts corresponding with those shown in Figs. 1 to 6 are given the same reference numerals with the addition of 300, I have shown the gasket 305 provided with an exterior beveled face 305a and the metal follower 306 is shown as comprising a vertical flange portion 308 and an inclined flange portion 308a meeting at an obtuse angle, the said flanges engaging and conforming to the outer perpendicular face and the inclined face 305a of the gasket. Where such a construction of follower is employed, the struts 320, one of which is shown in Fig. 9, will be provided with projections 320a and 320b separated by a recess 320c, said projections engaging respectively the flanges 308 and 308a of the follower 306, as shown in this figure, so as to distribute the pressure equally thereto, and said projections will be preferably rounded at their points of engagement with the follower, to enable them to shift with respect to the follower and as the pressure ring is tightened, so as to continue to distribute the pressure transmitted by the struts equally to both flanges of the follower and to the portions of the gasket engaged thereby.

In Fig. 10, in which the parts corresponding with those indicated in Figs. 1 to 6 have been given the same reference numerals with the addition of 400, I have illustrated a slight modification of my invention, in which the tension ring 412 and the pressure ring 425, follower 406, packing ring 405, and retaining ring 410 may be and preferably are constructed substantially as hereinbefore described with reference to Figs. 1 to 6. In this instance, however, I use a different form of strut, indicated at 420, which is provided with separated pivotal apertures 420a and 420b. The pressure ring 425 is passed through the aperture 420b and the pivotal aperture 420a is pivotally connected with one of the straps 417 by means of a suitable pivot pin, indicated at 420c, which may be riveted or otherwise secured against accidental displacement. The strut is provided with a V-shaped portion 420d for engaging the follower 406.

The operation of the clamp is substantially the same as that previously described, except for the fact that there is a pivotal connection between the strut and the clamp, and a second pivotal connection between the strut and the pressure ring, so that as the pressure ring is shortened, in the manner previously described, the pivotal portion 420b of the strut is drawn toward the pipe, in this instance on an axis concentric with the pivot 420 connecting it with the adjacent strap, thereby transmitting pressure to the follower in a direction toward the mouth of the bell, as in the previous constructions. With this construction the straps 417 are not required to be as long as would otherwise be necessary. The pressure ring can also be made of slightly less diameter than in the forms previously described.

In Figs. 11 and 12, in which the parts corresponding with those indicated in Figs. 1 to 6 are given the same reference numerals with the addition of 500, I have illustrated a further modification of my invention. In this instance each of the struts 520 is formed integral with one of the straps 517. In these figures each strap is provided at its outer end with a horizontal portion 518, which receives the pressure ring 525, in this instance formed of flat sheet material. At the outer end of this portion 518 the strap is bent upwardly and then sharply downwardly to form a stop 518a to prevent the pressure ring from slipping off, and the strap is then carried by an inclined portion 520a to a point indicated at 520b, and thence by a part 520c back to the inner end of the portion 518, where it is welded as shown. This produces a strut in the form of a V-shaped bracket connected with the opposite ends of the portion 518, which is contacted by the pressure ring 525. As the pressure ring is tightened, the outer end of the strut is drawn toward the pipe, and the pressure is transmitted by the V-shaped point of the strut, indicated at 520b, to the follower, in a direction toward the bell mouth.

In this construction it is obvious that the strap 517 must bend to accommodate the slight change of position of the strut comprising the parts 520a, 520b and 520c in applying the stress exerted by the pressure ring 518 to the follower, in a direction toward the bell.

It will be understood that the forms of the various parts of the clamps may be varied to suit the ideas of different constructors, or the exigencies of particular installations, without departing from the spirit of my invention.

What I claim and desire to secure by Letters Patent is:

1. In a clamp for bell and spigot joints, the combination with a gasket and metal follower therefor, of a contractible pressure applying ring surrounding the spigot, a plurality of inclined struts disposed at intervals around the spigot, operatively engaging said ring at their outer ends and having their inner ends engaging the follower, means for anchoring the outer ends of said struts to the bell, and adjustable pressure applying means for decreasing the diameter of said ring and thereby imparting a turning moment to all of said struts in a direction away from the bell and toward the spigot to distribute pressure through all of said struts simultaneously to said follower in a direction toward the bell.

2. In a clamp for bell and spigot joints, the combination with a gasket and metal follower therefor, of a contractible pressure applying ring surrounding the spigot, a plurality of inclined struts disposed at intervals around the spigot, operatively engaging said ring at their outer ends and having their inner ends engaging the follower, anchoring devices engaging the bell and pivotally connected with said ring adjacent to each of said struts, and adjustable pressure applying means for decreasing the diameter of said ring and thereby imparting a turning moment to all of said struts in a direction away from the bell and toward the spigot to distribute pressure through all of said struts simultaneously to said follower in a direction toward the bell.

3. In a clamp for bell and spigot joints, the combination with a gasket and metal follower therefor, of a contractible pressure applying ring surrounding the spigot, a plurality of inclined struts pivotally connected with said ring at their outer ends and having their inner ends engaging the follower, means for anchoring the outer ends of said struts to the bell, and adjustable pressure applying means for decreasing the diameter of said ring and thereby imparting a turning moment to all of said struts in a direction away from the bell and toward the spigot to distribute pressure through all of said struts simultaneously to said follower, in a direction toward the bell, and means for frictionally maintaining said struts in predetermined relation to the pressure ring to facilitate their proper engagement with the follower.

4. In a clamp for bell and spigot joints, the combination with a gasket and metal follower therefor, of a contractible pressure applying ring surrounding the spigot, a plurality of inclined struts pivotally connected with said ring at their outer ends and having their inner ends engaging the follower, a plurality of anchor straps having portions engaging said ring and yielding portions frictionally engaging the adjacent struts to hold them in predetermined relation with the ring to facilitate their proper engagement with the follower, said straps being provided with means for connecting them with the bell, and adjustable pressure applying means for decreasing the diameter of said ring and thereby imparting a turning moment to all of said struts in a direction away from the ball and toward the spigot to distribute pressure through all of said struts simultaneously to said follower in a direction toward the bell.

5. In a clamp for bell and spigot joints, the combination with a gasket and metal follower therefor, of a contractible pressure applying ring surrounding the spigot, a plurality of inclined struts pivotally connected with said ring at their outer ends and having their inner ends engaging the follower, a tension ring for engaging the bell in rear of the scarf thereof, anchor straps connecting said tension ring and pressure applying ring, said tension ring and pressure applying ring being formed in segments pivotally connected at points in substantial alignment longitudinally of the joint, said tension ring being provided with detachable connecting means for the opposite ends of its segments, and adjustable pressure applying means for connecting the ends of the pressure applying ring, for decreasing the diameter of said ring and thereby imparting a turning moment to all of said struts in a direction away from the bell and toward the spigot to distribute pressures through all of said struts simultaneously to said follower in a direction toward the bell.

6. A clamp for bell and spigot joints comprising a gasket for surrounding the spigot adjacent to the face of the bell, a metal follower for surrounding the spigot and engaging the gasket, a plurality of struts for engaging said follower at points adjacent to the spigot, a plurality of anchor straps provided with means for anchoring them with respect to the bell, said straps being pivotally connected to said struts, a contractible pressure ring engaging said struts at a distance from their pivotal connection with said straps, and adjustable pressure means for decreasing the diameter of the pressure ring and thereby imparting a turning moment to all of said struts in a direction away from the bell and toward the spigot to distribute pressure through al of said struts simultaneously to said follower in a direction toward the bell.

7. A clamp for bell and spigot joints comprising a gasket for surrounding the spigot adjacent to the face of the bell, a metal follower for surrounding the spigot and engaging the gasket, a plurality of anchor straps provided with means for securing them to the scarf of the bell, each of said straps being provided with an integral strut for engaging the follower and forcing it toward the bell, a contractible pressure ring surrounding the spigot and engaging said straps adjacent to said struts, and adjustable pressure means for decreasing the diameter of the pressure ring and thereby imparting a turning moment to all of said struts in a direction away from the bell and toward the spigot to distribute pressure through all of said struts simultaneously to said follower in a direction toward the bell.

EDWARD R. TORGLER.